Oct. 20, 1936.  J. C. FIDDYMENT  2,058,072
NUT RECRACKER
Filed June 30, 1934
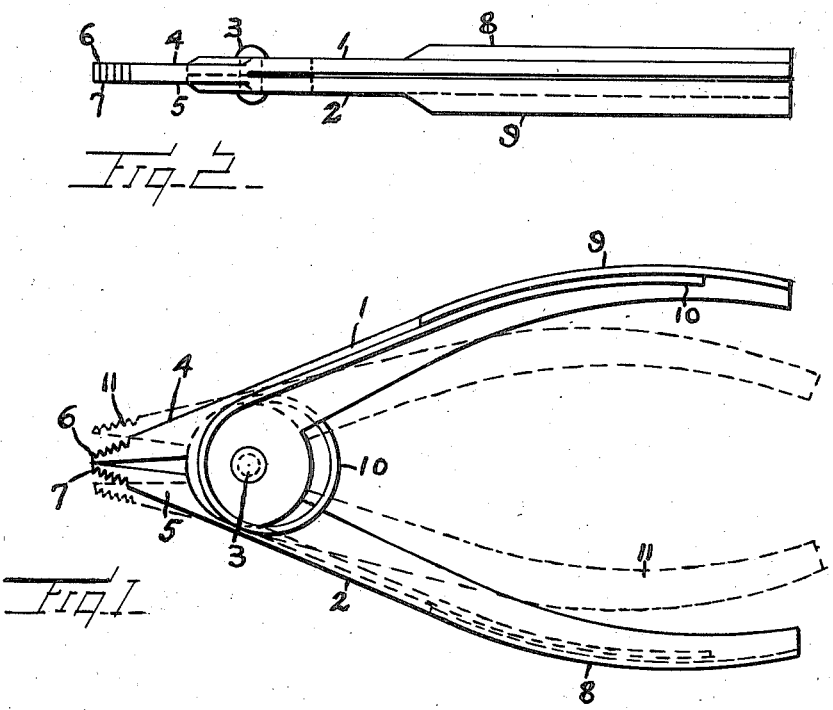
INVENTOR.
John C. Fiddyment Patented Oct. 20, 1936

2,058,072

UNITED STATES PATENT OFFICE 2,058,072

NUT RECRACKER

John C. Fiddyment, Lockport, Ill.

Application June 30, 1934, Serial No. 733,161

1 Claim. (Cl. 146—13)

This invention relates to nut crackers and pertains particularly to a manually operated device that is used to further crack the parts of a nut especially black walnuts that have been cracked, but not completely enough so that the kernel can be removed from the shell of its particular piece without further cracking.

This device was invented primarily to be used with my nut cracker, Serial No. 730,766, filed June 15, 1934, and it is also serviceable with other methods of cracking and other kinds of nuts. Some black walnuts have a very irregular shell thickness and internal shell structure which determines the form and distribution of the kernel in those nuts, and this to a large extent controls the results of the cracking in regard to the extraction of the kernel. A nut having regular shell thickness and kernel distribution will crack so that the kernel can usually be removed with little difficulty, but where the nut has an excess of shell thickness and sometimes with the kernel changed in form and location, there will be frequently found after the first cracking sections of the nut that will require further cracking in order to remove the kernel. These sections are difficult to crack in order not to crush or mutilate the meats by any other method than is used by this device which breaks the shell outwardly and away from the kernel, and the shell structure also offers less resistance to this manner of cracking than by the usual method of a blow on the surface of the shell which drives the shell into the kernel making a less desirable product and which consists mainly of small pieces more or less crushed. With this device the kernels are recovered uncrushed and in large pieces which has many advantages over the older method.

The preferred form of my invention is illustrated in the accompanying drawing, it being understood that changes in the precise embodiment of the invention may be made within the scope of what is claimed without departing from the spirit of the invention.

In the drawing, Figure 1 represents a side view of the parts assembled, the solid lines showing the jaws closed and the dotted lines illustrating the movement of the jaws in cracking the parts of a nut. Figure 2 is a top view of Figure 1, the spring that holds the jaws closed is omitted.

Referring more especially to the drawing, the numerals 1 and 2 indicate the sections of my improved nut recracker which are pivotally secured together by the pin 3 through openings in the sections 1 and 2. The sections 1 and 2 on one side of their pivot are formed into relatively thin jaws 4 and 5 that have parallel lateral faces, the outer marginal faces of the respective jaws tapering toward each other so as to constitute a small, bluntly-pointed nose portion on the device. Said marginal faces of the jaws are serrated at 6 and 7 at the nose portion, as shown, which serrations are adapted to bite into the shell of a nut to prevent the jaws from slipping and losing their hold thereon. Numerals 8 and 9 indicate the handles which have sufficient leverage so that the shell can be broken without difficulty. 10 is the spring which holds the jaws closed by forcing outwardly on the handles 8 and 9, the ends of the spring being shown under the flanged part of the handles. By holding the jaws in this closed position, the jaw terminals are more easily placed in the shell in such a manner so that by expanding same as shown at 11 in Figure 1 by the dotted lines, the shell can be broken along the desired lines for the removal of the kernel.

In operation, when a section of the cracked nut is found holding a part of the kernel so enclosed by shell that same can not be taken out, there will usually be found some opening formed by the connecting kernel or some shell projection where the jaws of this device can be inserted in such a manner that by compressing the handles which expands the jaws the shell can be broken along the lines desired for freeing the kernel. The teeth on the jaws cut into the shell so that their hold on same will not slip.

Having described the invention, I claim,

In a device for removing cracked shells of nuts from the kernels thereof, the combination of a pair of handles, of which one end of each handle constitutes a jaw, said handles being pivotally connected, without crossing each other, adjacent the jaw-ends thereof, so that the jaws open upon pressing of the handles together, said jaws being movable in a single plane and being relatively thin and flat in a transverse direction, and having outer marginal faces that taper toward each other to define a pointed nose, said outer marginal faces being serrated to a point immediately adjacent the nose thereof to prevent slippage of the jaws on the nutshell.

JOHN C. FIDDYMENT.